Nov. 18, 1958          D. URCHICK          2,860,378
FILLING VOIDS WITH PLASTIC FOAM
Filed Jan. 9, 1957
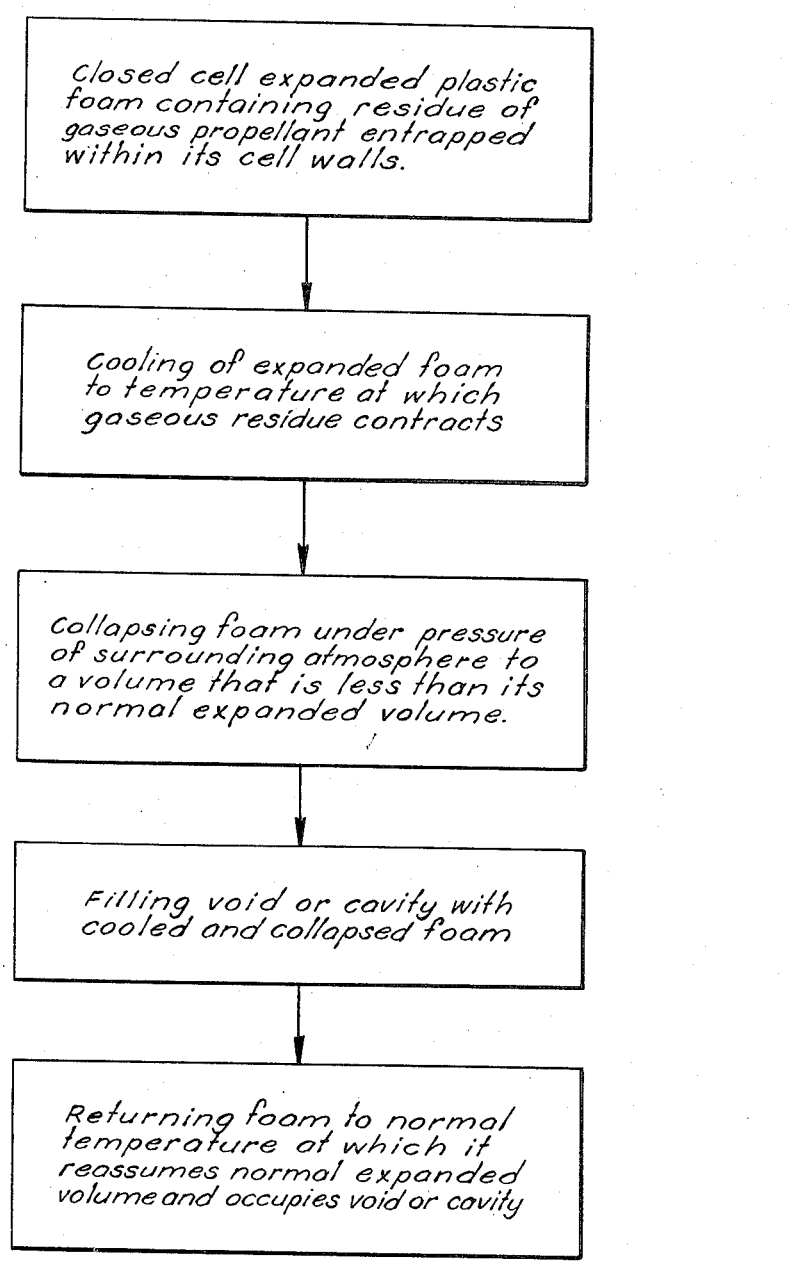
INVENTOR
Demetrius Urchick
BY
Griswold & Burdick
ATTORNEYS.

United States Patent Office 2,860,378
Patented Nov. 18, 1958

2,860,378

FILLING VOIDS WITH PLASTIC FOAM

Demetrius Urchick, Midland, Mich., assignor to The Dow Chemical Company, Midland, Mich., a corporation of Delaware Application January 9, 1957, Serial No. 633,187

8 Claims. (Cl. 18—48)

The present invention has reference to a novel and very useful technique for filling or occupying various structurally confined voids and cavities with flexible, closed cell plastic foams.

Pursuant to the known art, a variety of polymeric and resinous plastic materials may be expanded from an initially granular, bead (or other substantially solid shaped article or liquid) form to assume a flexible, porous, closed (or substantially closed) multi-cellular, solidified foam-like structure by the action of various propellants or agents for expanding or blowing the materials to a "foam." For convenience, the thus-formed expanded foam bodies of plastic material, which quite often are thermoplastic resinous materials, may be referred to hereinafter as "plastic foam," or as "plastic foam bodies," (the latter designation being included because it is frequently possible and advantageous to obtain the expanded product in particulate, non-integral form). The blowing agents, in accordance with common practice, are usually gases (or gas generating substances) or highly fugacious liquids which have been dissolved or otherwise incorporated within the plastic material while it is in an unexpanded form or, especially when thermoplastics are involved, in a partially expanded cellular form. The application of heat to an unfoamed or incompletely foamed thermoplastic resinous material containing a blowing agent, for example, causes the blowing agent to be released or thermally expanded, or both, while the thermoplastic material is attaining a foaming temperature at which it is sufficiently softened and yieldable to permit the pressure of the thermally expanding blowing agent to expand and form it into the desired foam structure. Other types of plastic materials are usually expanded or foamed in an analogous manner.

As a general rule, when closed cell plastic foams are prepared with plastic materials that are substantially impermeable to the blowing agent that is employed, a residue or remnant of the primary propellant gas that constitutes (or is derived from) the blowing agent that has been employed for at least the initial expansion remains entrapped within the cells of the expanded plastic foam. This, for example, is ordinarily the case with many thermoplastic resinous materials.

The heat energy which is required to release or thermally expand the blowing agent for the foam forming function (and, in the case of thermoplastic resinous materials, to simultaneously soften the plastic) may conveniently be derived from an externally generated source. Thus, steam, hot air, heated baths, radiant heat and other heat supplying and providing means (including, in some instances, dielectric heating) may be employed for the purpose of foaming various expandable plastic compositions.

Many expandable plastic materials, particularly a large number of thermoplastic resinous materials, have the potential for being expanded to flexible wall foam structures that have foamed volumes which may occupy as much as 30 to 250 and more times the original volume of the original expandable compositions in an unfoamed and completely unexpanded condition. This, by way of illustration, is particularly the case when "cycle-foaming" procedures are utilized for the preparation of greatly expanded, extraordinarily low density, plastic foam from various thermoplastic resinous materials in accordance with the disclosure that is contained in the copending application for United States Letters Patent having Serial Number 611,683, which was filed on September 24, 1956 by William J. McMillan and Keith R. Denslow for a Cycle Foaming Method of Making Cellular Plastic Bodies. Essentially, in such a cycle-foaming procedure, the foamed volume of an already expanded closed cell thermoplastic foam (which contains entrapped within its cells a residue of the primary blowing agent that was utilized and which is a non solvent or poor solvent for the plastic) may be increased by heating the plastic foam to a thermally plasticizing temperature for a time sufficient to plasticize the resin but below a temperature at which the foam would be collapsed or the plastic resin decomposed to expand the foam mass; then cooling and exposing said heat expanded mass to an atmosphere of a gas, preferably air, that has a permeability rate greater than the permeability rates of the primary propellant that constitutes or was derived from the initially employed blowing agent through the cell walls of the foamed mass; and subsequently repeating said cycles of heating and cooling with exposure to an atmosphere of said second more permeable gas for a plurality of cycles whereby the volume of the foamed mass is continually increased to a desired volume in excess of that which is ordinarily obtainable by conventional means from the thermal expansion of the primary propellant alone. In cycle-foaming, as has been described by McMillan and Denslow, it is preferable to employ dichlorodifluoromethane or the like gas as the primary propellant or blowing agent.

Given quantities of expandable thermoplastic and other varieties of plastic resinous materials may be foamed or expanded according to conventional methods within a confining space, such as a mold form, to provide various shaped articles that may be desired as plastic foam products. Or, in many instances, it may be exceptionally advantageous to expand the foam within the confining, or substantially confining, voids, cavities or other empty spaces of various utilitarian structures, such as refrigerator and automobile doors and the like hollow wall partitions and in buoyant articles and other hollow constructions. In this way a beneficial filling of plastic foam for insulation, reinforcement, buoyancy and corollary purposes, including many protective packaging applications, may be provided in the resulting products, which frequently are characterized as being of a composite or "sandwich" construction.

Difficulty, however, is oftentimes encountered in satisfactorily providing plastic foam fillings or centers and the like in the voids and cavities of hollow structural articles, which, as in various packages, may have or be intended to have other objects within their confines. Completely unexpanded or slightly expanded granular materials or bodies are frequently awkward and inconvenient to handle and may not be readily amenable to being properly or suitably distributed to obtain optimum uniform characteristics in the expanded plastic foam. Furthermore, when filling many hollow, utilitarian structures with plastic foam, the achievement of uniform through heating of the material in an expandable plastic composition in order to expand it into a foam may prove to be a vexatious, if not practically insurmountable, problem.

Therefore, the principal purpose of the present invention is to obviate the usual difficulties in filling structurally confined voids with plastic foam by providing an improved technique for readily and efficaciously attaining the indicated end.

In accordance with the practice of the present invention, a structurally confined void (or any desired portion thereof) may advantageously be filled, packed or occupied with a closed cell plastic foam which contains a gaseous residue of the primary gaseous or fugacious liquid fluid propellant that was utilized for its expansion entrapped within its cells and which is comprised of cell walls that are substantially impervious to said entrapped propellant and which consist of a flexible plastic material (which, in many instances, may advantageously be a thermoplastic resinous material) by a technique which comprises cooling a quantity of an expanded plastic foam from a normal temperature at which the blowing agent is in a gaseous condition to a temperature that is sufficiently low to cause contraction of the blowing agent residuum entrapped within its cells and at least partial collapse of the foam under the pressure of the atmosphere surrounding said foam to a volume less than the normal expanded volume of the foam, said quantity of foam having a normal expanded volume that is at least about as great (and preferably slightly greater) than the volume of the void that is to be occupied; filling the confined void (or desired portion thereof) with the cooled and collapsed quantity of foam; then returning said foam to a normal temperature (as by permitting it to warm naturally to the temperature of the surrounding atmosphere or even assisting such warming with purposive application of heat) at which normal temperature it reassumes its normal expanded volume thereby occupying said void or cavity. Practice of the present invention is schematically illustrated in the manner of a flow sheet diagram in the sole figure of the hereto annexed drawing.

The greatest advantage may ordinarily be derived when the plastic foam is cooled to a temperature at or beneath the liquefying or critical temperature of the entrapped gaseous residue of the initially-employed propellent in order to provide the greatest potential for collapse and maximum contraction or shrinkage of the expanded material due to the resulting loss of internal equilibrium pressure in its closed cells. For most entrapped propellents (including dichlorodifluoromethane and the like) very low temperatures that are at or near the temperature of liquid nitrogen may be most satisfactorily utilized for the cooling. In this connection, as a practical matter, the cooling and collapse of the foam may generally be effectively accomplished by immersing the expanded plastic foam in liquid nitrogen or the like or otherwise subjecting it to contact with such a cold, liquefied inert gas. Other liquefied gases besides nitrogen may also be utilized with benefit for the cooling and, if desired, other means for cooling may also be employed. Although the cooling and contracting step may be conducted in a surrounding atmosphere that is under a superatmospheric pressure, it is much preferred, as a matter of convenience, to effect it in the presence of ordinary atmospheric air under ordinary atmospheric pressure.

Usually, the plastic foam can be cooled and contracted to a volume that is a mere fraction of its normal expanded volume. This is especially so when the entrapped gaseous residue of the propellant is cooled to a liquefying temperature in order to accomplish the intended purpose. In such cases, the volume of the cooled and contracted foam may frequently be found to be greatly reduced (say by about 50 to 80 percent or more by volume greater) than was the initial expanded volume of the expanded plastic foam. This, for example, may frequently be observed with plastic foams derived from various thermoplastic resinous materials. In this connection, it is generally desirable to employ plastic foams that have been expanded to a volume which is at least about 30 times, and preferably at least about 100 times the initial unexpanded volume of the expandable composition from which the foam was derived, especially when foams from thermoplastic resinous materials are employed.

The plastic foam that is utilized may have any desired configuration including integral, unitary shapes that generally conform to the outline of the void to be packed. It is preferable, however, to employ the expanded foam in the form of a plurality of particulate bodies that, desirably, may have granular shapes such as plastic foam bodies that have been expanded from beads or granules of expandable thermoplastic resinous material. Particulate expanded foam bodies, especially those having a size roughly between about a quarter to three-quarters of an inch or an inch or so, can be readily cooled and easily and conveniently handled when cooled and contracted in order to facilitate their placement in the void to be filled. They also permit the greatest flexibility and versatility in the packing of irregularly shaped voids and cavities and may avoid certain inconveniences along this line which may arise with conforming integral bodies of plastic foam. Cycle-foamed bodies of thermoplastic foam are generally found to accommodate the realization of utmost benefit and satisfaction in the practice of the present invention.

The void to be filled need not be completely confined in order to permit practice of the invention. Likewise, it need not be completely packed with the plastic foam filling. Better results are usually obtained, however, when the void is completely or substantially completely confined and the volume of the expanded foam filling, prior to the packing of the void, is at least about as great as the volume of the void or in excess thereof. This facilitates achievement of a firmly packed, internally-pressuring, reinforcing filling of the plastic foam that occupies the cavity. In many cases, the use of a quantity of plastic foam that has a volume that is about one-tenth to one-third greater than the volume of the void to be occupied is quite suitable and may be most desirable for optimum results.

The cooling of the plastic foam and subsequent charging of the collapsed foam to the void and re-expansion of the foam can usually be accomplished in short order. At liquid nitrogen temperatures, most foams suitable for the purposes of the invention collapse in matters of seconds. Their re-expansion upon normal warming is also quick; generally occurring within a minute or so, although large masses may require somewhat longer periods of time.

Any plastic material which can be expanded or foamed by conventional techniques to provide closed-cell foams with flexible cell walls may advantageously be used in the plastic foam that is utilized in the practice of the invention. It is merely necessary for the cell walls of the plastic foam to be sufficiently flexible to permit the collapse and structural regain of the cellular foam structure during the cooling and returning to normal temperatures of the foam. To this end, plastic foams that have relatively thin cell walls by conventional standards may oftentimes be found to be better adapted for the indicated usage. Many plastic foams of various thermoplastic resinous materials have cell walls with suitable moduli of flexure for such purpose and may thus be utilized with pronounced advantage. By way of illustration, thermoplastic polymers, copolymers and interpolymers or graft copolymers of styrene, alpha-methyl styrene, ar-methyl styrene (vinyltoluene), mono- and dichlorostyrene and ar-dimethyl styrene may be utilized with especial benefit in the plastic foams, as may other alkenyl aromatic resinous materials and compounds. As is well understood in the art, alkenyl aromatic compounds are those containing at least about 50 percent by weight of at least one alkenyl aromatic compound having the general formula $G\text{---}CX=CH_2$ wherein G is an aromatic radical and X is selected from the group consisting of a hydrogen atom and a methyl radical. Plastic foams of other thermoplastic resinous materials may also be utilized with advantage including polymers and various copolymers of methyl methacrylate, ethyl acrylate and the like, vinyl acetate, vinyl butyral and the like, and various thermoplastic or thermoplastified derivatives of cellulose including cellulose nitrate and cellulose acetate as well as many foams suitable for use in the practice of the invention from various non-thermoplastic polymeric and resinous materials.

The plastic foams may be prepared from expandable compositions that initially contain conventional quantities of particular blowing agents for being expanded to a foam structure. Thus, plastic foam bodies that have been prepared from polystyrene containing 5 to 15 percent by weight of dichlorodifluoromethane may be utilized. No abnormal or inordinate gaseous residuum of the propellant need be present in the closed cells of the plastic foam in order to adapt it for the purposes of the present invention. The normally present residue of propellant that remains entrapped in the cell walls is generally a suitable and operable quantity to be present.

By way of further illustration, plastic foam bodies (obtained by cycle-foaming one-eighth inch expandable polystyrene granules containing about 10 percent by weight of dichlorodifluoromethane) were poured into a container of liquid nitrogen whereupon then shrunk to a volume that was only about 20 percent of their normal expanded volume. The expanded plastic foam bodies had a roughly granular form with an average volume of about 5.6 cubic centimeters. They were the product of a cycle foaming of the initially unexpanded granules through four separate heating and cooling cycles (to 120° C. and room temperature) at twelve hour intervals to attain an expanded foam structure having a volume about 200 times that of the original unexpanded granules. The cooled and contracted expanded foam bodies, upon being removed from the liquid nitrogen, re-expanded to their original dimensions at room temperature. About five seconds were required for cooling and contracting the plastic foam in the liquid nitrogen and about 20 seconds for their re-expansion after removal from the coolant.

When a normal expanded volume of about 600 cubic centimeters of the above plastic foam bodies were cooled and contracted in the foregoing manner and, while so contracted, poured into an enclosed cylindrical container having about a 375 cubic centimeter volume, and a height of about 12.5 centimeters they were observed to completely and tightly pack the container with a uniform filling of plastic foam.

Certain changes and modifications in the practice of the present invention can be readily entered into without substantially departing from its intended spirit and scope. Therefore, it is to be fully understood that the invention is not to be considered as being limited or in any way restricted to or by the preferred diadactic embodiments thereof which are set forth in the foregoing description and specification. Rather, it is to be interpreted and construed liberally in the light of what is set forth and defined in the hereto apprehended claims.

What is claimed is:

1. Technique for filling structurally confined voids with a packing of closed cell plastic foam which contains a gaseous residue of the primary propellant that was utilized for its expansion entrapped within its cell walls, said cell walls being substantially impervious to said entrapped propellant and which foam consists of a flexible plastic material, which technique comprises cooling a quantity of an expanded plastic foam from a normal temperature to a temperature that is sufficiently low to cause contraction of the gaseous blowing agent residuum entrapped within its cells and to collapse the foam under the pressure of the surrounding atmosphere to a volume that is less than its normal expanded volume, said quantity of foam having a normal expanded volume that is at least about as great as the volume of the portion of void that is to be occupied; filling the void with the cooled and collapsed quantity of foam; then returning said foam to a normal temperature at which it reassumes at least a portion of its normal expanded volume thereby occupying said void or cavity.

2. Cooling the plastic foam to a liquefying temperature for said entrapped gaseous propellant in the practice of the technique described in claim 1.

3. Utilizing particulate, expanded plastic foam bodies in the practice of the technique described in claim 1.

4. Utilizing plastic foam having an expanded volume that is at least about 30 times the initial, unexpanded volume of the expandable composition from which the foam was derived in the practice of the technique described in claim 1.

5. Utilizing a plastic foam derived from a thermoplastic resinous material in the practice of the technique described in claim 1.

6. Utilizing plastic, styrene polymer foam containing entrapped dichlorodifluoromethane in the practice of the technique described in claim 1.

7. Cooling and collapsing the plastic, styrene polymer foam containing entrapped dichlorodifluoromethane with liquid nitrogen in the practice of the technique described in claim 6.

8. Employing a quantity of foam which has a normal expanded volume that is between about one-tenth and one-third greater than the volume of the void which is to be occupied by said foam in the practice of the technique described in claim 1.

References Cited in the file of this patent

UNITED STATES PATENTS

| | | |
|---|---|---|
| 2,091,335 | Roberts et al. | Aug. 31, 1957 |
| 2,706,311 | Durst et al. | Apr. 19, 1955 |
| 2,744,291 | Stastny et al. | May 8, 1956 |

OTHER REFERENCES

"Plastics World," Foaming-Agent-Impregnated Polystyrene Beads Expand in Heated Molds to Controllable Sizes and Densities, page 4, March 1954.